(12) United States Patent
Walsh et al.

(10) Patent No.: US 10,382,962 B2
(45) Date of Patent: Aug. 13, 2019

(54) NETWORK AUTHENTICATION SYSTEM WITH DYNAMIC KEY GENERATION

(71) Applicant: Analog Devices, Inc., Norwood, MA (US)

(72) Inventors: John J. Walsh, Lutz, FL (US); John Ross Wallrabenstein, West Lafayette, IN (US); Charles J. Timko, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 351 days.

(21) Appl. No.: 14/720,636

(22) Filed: May 22, 2015

(65) Prior Publication Data
US 2015/0341792 A1 Nov. 26, 2015

Related U.S. Application Data

(60) Provisional application No. 62/001,979, filed on May 22, 2014.

(51) Int. Cl.
*H04L 29/06* (2006.01)
*H04W 12/08* (2009.01)
(Continued)

(52) U.S. Cl.
CPC .............. *H04W 12/08* (2013.01); *G09C 1/00* (2013.01); *H04L 9/0866* (2013.01);
(Continued)

(58) Field of Classification Search
CPC ... H04L 9/3218; H04L 9/0866; H04L 9/3271; H04L 9/0819; H04L 9/3221; H04L 63/061; H04L 63/045
See application file for complete search history.

(56) References Cited

U.S. PATENT DOCUMENTS

| 7,564,345 B2 | 7/2009 | Devedas et al. |
| 7,581,248 B2 | 8/2009 | Atkins et al. |

(Continued)

FOREIGN PATENT DOCUMENTS

| JP | 2005-073274 A | 3/2005 |
| JP | 2008-545323 A | 12/2008 |

(Continued)

OTHER PUBLICATIONS

International Search Report and Written Opinion dated Sep. 1, 2015 for Application No. PCT/US2014/064738.
(Continued)

*Primary Examiner* — Khoi V Le
(74) *Attorney, Agent, or Firm* — Wolf, Greenfield & Sacks, P.C.

(57) ABSTRACT

A network authentication system with dynamic key generation that facilitates the establishment of both endpoint identity, as well as a secure communication channel using a dynamically-generated key between two end devices (potentially on separate local area networks). An interactive or non-interactive authentication protocol is used to establish the identity of the target end device, and dynamic key generation is used to establish a shared symmetric session key for creating an encrypted communication channel between the end devices.

20 Claims, 1 Drawing Sheet

(51) Int. Cl.
*G09C 1/00* (2006.01)
*H04L 9/08* (2006.01)
*H04L 9/32* (2006.01)

(52) U.S. Cl.
CPC .......... *H04L 9/3218* (2013.01); *H04L 9/0825* (2013.01); *H04L 63/045* (2013.01); *H04L 63/061* (2013.01)

(56) References Cited

U.S. PATENT DOCUMENTS

| | | | |
|---|---|---|---|
| 7,653,197 | B2 | 1/2010 | Van Dijk |
| 7,702,927 | B2 | 4/2010 | Devedas et al. |
| 7,839,278 | B2 | 11/2010 | Devedas et al. |
| 7,926,089 | B2 | 4/2011 | Tulshibagwale et al. |
| 7,962,516 | B2 | 6/2011 | Bahrs et al. |
| 8,281,127 | B2 | 10/2012 | Hayes |
| 8,290,150 | B2 | 10/2012 | Erhart et al. |
| 8,346,951 | B2 | 1/2013 | Hayes |
| 8,379,856 | B2 | 2/2013 | Potkonjak |
| 8,386,990 | B1 | 2/2013 | Trimberger et al. |
| 8,418,006 | B1 | 4/2013 | Trimberger et al. |
| 8,458,489 | B2 | 6/2013 | Beckmann et al. |
| 8,463,813 | B2 | 6/2013 | Siress et al. |
| 8,468,186 | B2 | 6/2013 | Yu |
| 8,510,608 | B2 | 8/2013 | Futa et al. |
| 8,516,269 | B1 | 8/2013 | Hamlet et al. |
| 8,525,169 | B1 | 9/2013 | Edelstein et al. |
| 8,566,579 | B2 | 10/2013 | Armstrong et al. |
| 8,667,265 | B1* | 3/2014 | Hamlet ............. H04L 9/0866 326/80 |
| 8,782,396 | B2 | 7/2014 | Ziola et al. |
| 8,848,905 | B1 | 9/2014 | Hamlet et al. |
| 8,918,647 | B1 | 12/2014 | Wallrabenstein |
| 9,998,445 | B2 | 6/2018 | Wallrabenstein |
| 2003/0048173 | A1* | 3/2003 | Shigematsu ............ G06F 21/32 340/5.52 |
| 2005/0149496 | A1 | 7/2005 | Mukherjee et al. |
| 2005/0210252 | A1* | 9/2005 | Freeman ................. G06F 21/31 713/171 |
| 2005/0222896 | A1 | 10/2005 | Rhyne et al. |
| 2007/0036353 | A1* | 2/2007 | Reznik ................. H04B 7/0434 380/30 |
| 2008/0069341 | A1 | 3/2008 | Relyea |
| 2008/0256549 | A1 | 10/2008 | Liu et al. |
| 2008/0256600 | A1 | 10/2008 | Schrijen et al. |
| 2009/0063860 | A1* | 3/2009 | Barnett ............... H04L 63/0442 713/171 |
| 2009/0083833 | A1* | 3/2009 | Ziola ...................... G06F 21/31 726/2 |
| 2010/0031065 | A1 | 2/2010 | Futa et al. |
| 2010/0122093 | A1 | 5/2010 | Tuyls et al. |
| 2010/0127822 | A1 | 5/2010 | Devedas |
| 2010/0228982 | A1* | 9/2010 | Zhu ....................... H04L 9/3271 713/175 |
| 2010/0272255 | A1 | 10/2010 | Devedas et al. |
| 2011/0033041 | A1 | 2/2011 | Yu et al. |
| 2011/0215829 | A1 | 9/2011 | Guajardo et al. |
| 2011/0299678 | A1 | 12/2011 | Deas et al. |
| 2012/0072717 | A1 | 3/2012 | Hayes |
| 2012/0072737 | A1 | 3/2012 | Schrijen et al. |
| 2012/0114261 | A1* | 5/2012 | Cheon ...................... G06T 9/00 382/239 |
| 2012/0137137 | A1 | 5/2012 | Brickell et al. |
| 2012/0183135 | A1 | 7/2012 | Paral et al. |
| 2013/0268766 | A1* | 10/2013 | Schrecker ............ G06F 21/34 713/185 |
| 2015/0195088 | A1 | 1/2015 | Rostami et al. |
| 2015/0082405 | A1* | 3/2015 | Sakemi .................. G06F 21/31 726/7 |
| 2015/0134966 | A1 | 5/2015 | Wallrabenstein |
| 2016/0021096 | A1 | 1/2016 | Wallrabenstein |

FOREIGN PATENT DOCUMENTS

| | | | | |
|---|---|---|---|---|
| JP | 2009-517910 | A | 4/2009 | |
| JP | 2011-526113 | A | 9/2011 | |
| KR | 10-2008-0029841 | * | 3/2008 | ............... H04L 9/32 |
| KR | 20090104421 | A | 10/2009 | |
| WO | WO 2010/105993 | A2 | 9/2010 | |

OTHER PUBLICATIONS

International Preliminary Report on Patentability dated Jan. 22, 2016 for Application No. PCT/US2014/064738.
Invitation to Pay Additional Fees dated Aug. 26, 2015 for Application No. PCT/US2015/032320.
International Search Report and Written Opinion dated Nov. 6, 2015 for Application No. PCT/US2015/032320.
International Preliminary Report on Patentability dated Aug. 4, 2016 for Application No. PCT/US2015/032320.
[No Author Listed], What is MAC address/Burned In Addressses(BIA)/Ethernet addresses? Creative World9. Apr. 16, 2012. http://www.creativeworld9.com/2012/06/what-is-mac-addressburned-in.html [last accessed Mar. 26, 2017]. 1 page.
Abercrombie et al., Secure Cryptographic Key Management System (CKMS) Considerations for Smart Grid Devices. CSIIRW '11 Proceedings of the Seventh Annual Workshop on Cyber Security and Information Intelligence Research, Oak Ridge, TN. Article No. 59. Oct. 12-14, 2011. 4 pages.
Armknecht et al., A Formalization of the Security Features of Physical Functions. Proceedings of the 2011 IEEE Symposium on Security and Privacy, SP '11. 2011;397-412.
Bose et al., On a class of error correcting binary group codes. Info Control. Mar. 1960;3(1):68-79.
Boyko et al., Speeding up discrete log and factoring based schemes via precomputations. Advances in Cryptology, EUROCRYPT '98. 1998;1403:221-35.
Canetti, Universally composable security: A new paradigm for cryptographic protocols. Proceedings of the 42nd IEEE Symposium on Foundations of Computer Science, FOCS '01. Oct. 9, 2001;136-.70 pages.
Chen et al., New algorithms for secure outsourcing of modular exponentiations. Computer Security, ESORICS 2012. 2012;7459:541-56.
Fiege et al., Zero Knowledge Proofs of Identity. Proceedings of the 19th Annual ACM Symposium on Theory of Computing (STOC). 1987:210-7.
Gardner et al., Toward Trusted Embedded Systems. 2nd Annual NSA Trusted Computing Conference and Exposition. Orlando, FL. Sep. 21, 2011. 25 pages.
Gassend et al., Silicon Physical Random Functions. Proceedings of the 9th ACM Conference on Computer and Communications Security, CCS '02. 2002;148-60.
Goldwasser et al., One-Time Programs. Proceedings of the 28th Annual Conference on Cryptology: Advances in Cryptology. CRYPTO. 2008;39-56.
Guajardo et al., FPGA intrinsic PUFs and Their Use for IP Protection. Proceedings of the 9th Cryptographic Hardware and Embedded Systems Workshop (CHES). 2007;4727. 22 pages.
Guajardo et al., Physical Unclonable Functions and Public-Key Crypto for FPGA IP Protection. International Conference on Field Programmable Logic and Applications. 2007. 8 pages.
Handschuh et al., Hardware Intrinsic Security from Physically Unclonable Functions. Towards Hardware-Intrinsic Security, Information Security and Cryptography. 2010;39-53.
Katzenbeisser et al., PUFs: Myth, Fact or Busted? A Security Evaluation of Physically Unclonable Functions (PUFs) Cast in Silicon. Cryptographic Hardware and Embedded Systems—CHES '12. 2012;283-301. 18 pages.
Kerr et al., PEAR: A Hardware Based Protocol Authentication System. SPRINGL '10 Proceedings of the 3rd ACM 3IGSPATIAL International Workshop on Security and Privacy in GIS and LBS. 2010. 8 pages.

(56) References Cited

OTHER PUBLICATIONS

Kerr, Secure Physical System Design Leveraging PUF Technology. Purdue University. Thesis. May 2012. 87 pages.
Kirkpatrick et al., Enforcing Physically Restricted Access Control for Remote Data. Proceedings of CODASPY. 2011. 10 pages.
Kirkpatrick et al., PUF ROKs: A Hardware Approach to Read-Once Keys. Proceedings of the 6th ACM Symposium on Information, Computer and Communications Security, ASIACCS '11. 2011;155-64.
Kirkpatrick et al., PUF ROKS: Generating Read-Once Keys with Physically Unclonable Functions (Extended Abstract). Proceedings of the 6th Annual Workshop on Cyber Security and Information Intelligence Research. Oak Ridge, TN. Apr. 21-23, 2010. 4 pages.
Kirkpatrick et at, Physically Restricted Authentication and Encryption for Cyber-physical Systems. DHS Workshop on Future Directions in Cyber-physical Systems Security. 2009. 5 pages.
Kish et al., Physical Uncloneable Function Hardware Keys Utilizing Kirchhoff-Law Johnson-Noise Secure Key Exchange and Noise-Based Logic. Fluctuation Noise Lett. 2013;12. 9 pages.
Kuppusamy, Modelling Client Puzzles and Denial-of-Service Resistant Protocols. Information Security Institute. Science and Engineering Faculty. Queensland University of Technology. Thesis. Nov. 8, 2012. 198 pages.
Maiti et al., Physical Unclonable Function and True Random Number Generator: a Compact and Scalable implementation. GLSVLSI '09 Proceedings of the 19th ACM Great Lakes Symposium on VLSI. 2009. 4 pages.
Maiti et al., The Impact of Aging on an FPGA-Based Physical Unclonable Function. International Conference on Field Programmable Logic and Applications (FPL). 2011;151-6.
Nabeel et al., Authentication and key management for advanced metering infrastructures utilizing physically unclonable function. IEEE Third International Conference on Smart Grid Communications (SmartGridComm). 2012;324-9.
Nguyen et al., Distribution of Modular Sums and the Security of the Server Aided Exponentiation. Cryptography and Computational Number Theory. 2001;20:331-42. 16 pages.
Paral et al., Reliable and Efficient PUF-based Key Generation using Pattern Matching. IEEE International Symposium on Hardware-Oriented Security and Trust (HOST). 2011;128-33.
Potkonjak et al., Differential Public Physically Unclonable Functions: Architecture and Applications. DAC '11 Proceedings of the 48th Design Automation Conference. 2011. 7 pages.
Ravikanth, Physical one-way functions. Massachusetts Institute of Technology. Dissertation. 2001. 154 pages.
Rührmair et al., PUFs in Security Protocols: Attack Models and Security Evaluations. 2013 IEEE Symposium on Security and Privacy. 2013;286-300.
Shao, Strong designated verifier signature scheme: new definition and construction. Zhejian University of Science and Technology. IACR Cryptology ePrint Archive. 2010. 10 pages.
Van Dijk et al., Physical Unclonable Functions in Cryptographic Protocols: Security Proofs and Impossibility Results. Cryptolgoy ePrint Archive. Report 2012/228. Apr. 25, 2012. 36 pages.
Wu et al., On Foundation and Construction of Physical Unclonable Functions. IACR Cryptology ePrint Archive. 2010;171. 18 pages.
Yu et al., Lightweight and Secure PUF Key Storage Using Limits of Machine Learning. Proceedings of the 13th International Conference on Cryptographic Hardware and Embedded Systems, CHES '11. 2011;358-73.
Yu et al., Recombination of Physical Unclonable Functions. GOMACTech. 2010. 4 pages.
Yu et al., Secure and robust error correction for physical unclonable functions. IEEE Des Test. Jan. 2010;27(1):48-65.
Frikken et al., "Robust Authentication using Physically Unclonable Functions," Information Security, vol. 5735 of Lecture Notes in Computer Science, pp. 262-277 (Springer 2009).
Rührmair et al., "Modeling Attacks on Physical Unclonable Functions," Proceedings of the 17th ACM conference on Computer and communications security, CCS '10, pp. 237-249 (ACM 2010).
Holcomb et al., "Initial SRAM State as a Fingerprint and Source of True Random Numbers for RFID Tags," In Proceedings of the Conference on RFID Security (2007).
Kumar et al., "Extended abstract: The Butterfly PUF Protecting IP on Every FPGA," IEEE International Workshop on Hardware-Oriented Security and Trust, pp. 67-70 (2008).
Lee et al., "A technique to build a secret key in integrated circuits for identification and authentication applications," IEEE Symposium on VLSI Circuits: Digest of Technical Papers, pp. 176-179 (2004).
Suh et al., "Physical Unclonable Functions for Device Authentication and Secret Key Generation," Proceedings of the 44th annual Design Automation Conference, DAC '07, pp. 9-14 (ACM 2007).
Tuyls et al., "Read-Proof Hardware from Protective Coatings," Proceedings of the 8th international conference on Cryptographic Hardware and Embedded Systems, CHES'06, pp. 369-383 (Springer 2006).
Rührmair, "Applications of High-Capacity Crossbar Memories in Cryptography," IEEE Trans. Nanotechnol. 10:3, pp. 489-498 (2011).
Juels et al., "A Fuzzy Commitment Scheme," Proceedings of the 6th ACM conference on Computer and Communications Security, CCS '99, pp. 28-36 (ACM 1999).
Dodis et al., "Fuzzy Extractors: How to Generate Strong Keys from Biometrics and Other Noisy Data," SIAM J. Comput., 38:1, pp. 97-139 (2008).
Brzuska et al., "Physically Uncloneable Functions in the Universal Composition Framework," Advances in Cryptology—CRYPTO 2011—31st Annual Cryptology Conference, vol. 6841 of Lecture Notes in Computer Science, p. 51-70 (Springer 2011).
Zheng, "Digital Signcryption or How to Achieve Cost(Signature & Encryption) « Cost(Signature) + Cost(Encryption)," Advances in Cryptology, CRYPTO '97, vol. 1294 of Lecture Notes in Computer Science, pp. 165-179 (Springer 1997).
Zheng et al., "How to Construct Efficient Signcryption Schemes on Elliptic Curves," Inf. Process. Lett., 68:5, pp. 227-233 (1998).
Chaum et al., "An improved protocol for demonstrating possession of discrete logarithms and some generalizations," Proceedings of the 6th annual international conference on Theory and application of cryptographic techniques, EUROCRYPT'87, pp. 127-141, Berlin, Heidelberg, 1988, Springer-Verlag.
Khandavilli, "A Mobile Role Based Access Control System Using Identity Based Encryption With Non-Interactive Zero Knowledge Proof of Authentication," Dalhousie University Repository, Faculty of Graduate Studies Online Theses, Apr. 5, 2012.
Guajardo et al., "FPGA intrinsic PUFs and Their Use for IP Protection," Proceedings of the 9th Cryptographic Hardware and Embedded Systems Workshop (CHES), vol. 4727, 2007.
Extended European Search Report dated Dec. 18, 2017 in connection with European Application No. EP 15795660.8.
Shao, Efficient deniable authentication protocol based on generalized ElGamal signature scheme. Computer Standards & Interfaces. 2004;26:449-54.
Shao et al., A Non-interactive Deniable Authentication Protocol based on Elliptic Curve Discrete Logarithm Problem. Energy Procedia. Jan. 1, 2011;11:1018-25.

* cited by examiner

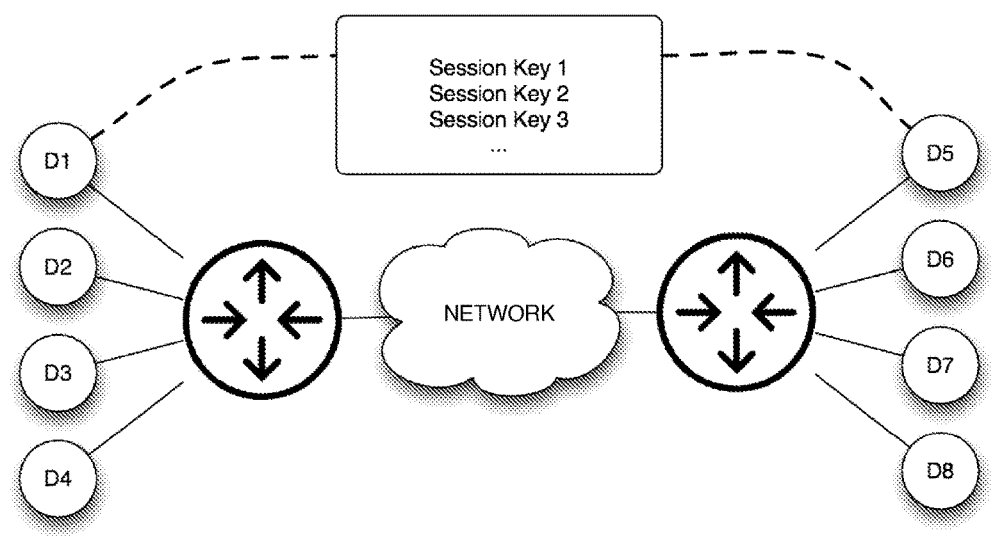

NETWORK AUTHENTICATION SYSTEM WITH DYNAMIC KEY GENERATION

CROSS REFERENCE TO BELATED APPLICATIONS

This application claims the benefit of the priority of and incorporates by reference provisional U.S. patent application Ser. No. 62/001,979 filed May 22, 2014.

FIELD OF THE INVENTION

This disclosure relates generally to network authentication, and in particular but not exclusively, to authentication to protect against tampering and subversion by substitution.

BACKGROUND OF THE INVENTION

An essential aspect of online communication is the ability of two endpoints to establish an authenticated channel based on their respective identities. One solution to this employs public key infrastructure (PKI), wherein public keys allow end devices to be reasonably convinced that they are communicating only with each other. In this scheme, however, an endpoint and its identity are generally independent, i.e., an arbitrary identity is generated and assigned to an endpoint.

In various device authentication schemes, physical unclonable functions (PUFs) have been used such that each device has a unique identity intrinsically linked to the device. Rührmair et al. ("Modeling Attacks on Physical Unclonable Function." *Proceedings of the 17th ACM conference on Computer and communications security*, CCS '10, pages 237-249, ACM. 2010) define three distinct classes of PUF devices:

- A Weak PUF is typically used only to derive a secret key. The challenge space may be limited, and the response space is assumed to never be revealed. Typical constructions include the SRAM (Holcomb et al., "Initial SRAM State as a Fingerprint and Source of True Random Numbers for RFID Tags," *In Proceedings of the Conference on RFID Security*, 2007), Butterfly (Kumar et al., "Extended abstract: Butterfly PUF Protecting IP on Every FPGA," *IEEE International Workshop on Hardware-Oriented Security and Trust*, pages 67-70, 2008), Arbiter (Lee et al., "A technique to build a secret key in integrated circuits for identification and authentication applications," *IEEE Symposium on VLSI Circuits: Digest of Technical Papers*, pages 176-179, 2004), Ring Oscillator (Suh et al., "Physical Unclonable Functions for Device Authentication and Secret Key Generation," *Proceedings of the 44th, annual Design Automation Conference*, DAC '07, pages 9-14, ACM, 2007), and Coating (Tuyls et al., "Read-Proof Hardware from Protective Coatings," *Proceedings of the 8th international conference on Cryptographic Hardware and Embedded Systems*, CHES'06, pages 369-383, Springer, 2006) PUFs.
- A Strong PUF is assumed to be (i) physically impossible to clone, (ii) impossible to collect a complete set of challenge response pairs in a reasonable time (typically taken to be on the order of weeks), and (iii) difficult to predict the response to a random challenge. For example, the super-high information content (SHIC) PUF described by Rührmair ("Applications of High-Capacity Crossbar Memories in Cryptography,"*IEEE Trans. Nanotechnol.*, volume 10, no. 3:489-498, 2011) may be considered a Strong PUF.
- A Controlled PUF satisfies all of the criteria for strong PUFs, and additionally implements an auxiliary control unit capable of computing more advanced functionalities to cryptographically augment protocols.

PUF output is noisy in that it varies slightly despite evaluating the same input. This is generally addressed with fuzzy extraction, a method developed to eliminate noise in biometric measurements. (See Juels et al., "A Fuzzy Commitment Scheme," *Proceedings of the 6th ACM conference on Computer and Communications Security*, CCS '99, pages 28-36, ACM, 1999). Fuzzy extraction may in part be employed within a device having a PUF such as within an auxiliary control unit, such that the output is constant for a fixed input. Fuzzy extraction (or reverse fuzzy extraction) may for example employ a "secure sketch," as described by Juels et al. to store a sensitive value V to be reconstructed and a helper string P for recovering V. A secure sketch SS for input string O, where ECC is a binary (n, k, 2t+1) error correcting code of length n capable of correcting t errors and $V \leftarrow \{0, 1\}^k$ is a k-bit value, may for example be defined as $SS(O;V) = O \oplus ECC(V)$. The original value V then may be reproduced given the helper string P and an input O' within a maximum Hamming distance t of O using a decoding scheme D for the error-correcting code ECC and O', as $D(P \oplus O') = D(O \oplus ECC(V) \oplus O') = V$.

A physical unclonable function $P_d: \{0,1\}^{\kappa_1} \to \{0,1\}^{\kappa_2}$ bound to a device d preferably exhibits the following properties:

1. Unclonability: $\Pr[\text{dist}(y,x) \leq t | x \leftarrow U_{\kappa_1}, y \leftarrow P(x), z \leftarrow P'] \leq \epsilon_1$, the probability of duplicating PUF P with a clone PUF P' such that their output distributions are t-statistically close is less than some sufficiently small $\epsilon_1$.
2. Unpredictability: It is desirable that an adversary cannot predict a device's PUF response r for a challenge c with more than negligible probability (at least without physical access to the device), and that helper data does not reveal anything to an adversary about PUF responses. Assuming that all entities are bound to probabilistic polynomial-time (PPT), i.e., can only efficiently perform computation requiring polynomially many operations with respect to a global security parameter $\lambda$ (which refers to the number of bits in the relevant parameter). $\text{Adv}\,\mathcal{A}^{PUF\text{-}PRED}(\kappa_2) = \Pr[r=r']$, denoting the probability of the adversary $\mathcal{A}$ guessing the correct response r of the PUF P to the challenge c, is preferably negligible in $\kappa_2$. This can be assessed, for example, through a game between an adversary $\mathcal{A}$ and a PUF device $P: \{0,1\}^{\kappa_1} \mapsto \{0,1\}^{\kappa_2}$ mapping input strings from the challenge space $\bar{\mathcal{C}}_P$ of length $\kappa_1$ to the response space $\bar{\mathcal{R}}_P$ of length $\kappa_2$ where $\lambda$ is the security parameter for the protocol, given in unary as $1^\lambda$.

| PUF-PRED: PUF Prediction Game | | |
|---|---|---|
| Adversary A | | PUF Device P |
| (1) $c_i \in \bar{C}_P \subset C_P$, $0 \leq i \leq \text{poly}(\lambda)$ | $\to$ | |
| | $\leftarrow$ | $r_i = P(c_i) \in \bar{R}_P$ (2) $\bar{R}_P \subset R_P$, $0 \leq i \leq \text{poly}(\lambda)$ |
| (3) Challenge $c \notin \bar{C}_P$ | $\to$ | |
| (4) $c_i' \in \bar{C}_P' \subset C_P$, $c \notin \bar{C}_P'$, $0 \leq i \leq \text{poly}(\lambda)$ | $\to$ | |

| PUF-PRED: PUF Prediction Game | | |
|---|---|---|
| Adversary A | | PUF Device P |
| | ← | $r_i' = P(c_i') \in \overline{R}_P'$ (5) $\overline{R}_P' \subset R_P,$ $0 \le i \le \text{poly}(\lambda)$ |
| (6) Guess $r' \stackrel{?}{=} P(c)$ | → | |

The game proceeds as follows:

1. The adversary $\mathcal{A}$ issues polynomially many (w.r.t. the security parameter $\lambda$) challenges $c_i \in \bar{\mathcal{C}}_P$ to the PUF device P, where the challenge set $\bar{\mathcal{C}}_P$ is a proper subset of the entire challenge space $\bar{\mathcal{C}}_P$.

2. The PUF device P returns the responses $\{r_i | r_i \leftarrow P(c_i)\}$ to $\mathcal{A}$.

3. The adversary $\mathcal{A}$ eventually outputs a challenge c that was not in the original set of challenge queries $\bar{\mathcal{C}}_P$. The adversary is not allowed to query the PUF device P on the committed challenge c.

4. The adversary $\mathcal{A}$ may once again issue a new set of polynomially many challenges $c_i' \in \mathcal{C}_P'$ to the PUF device P. The adversary is not allowed to query the PUF device P on the committed challenge c.

5. The PUF device P returns the responses $\{r_i' | r_i' \leftarrow P(c_i')\}$ to $\mathcal{A}$.

6. The adversary $\mathcal{A}$ eventually outputs a guess r' for P's response to the committed challenge c.

The adversary only wins the game when guess r' is equal to P's actual response $r \leftarrow P(c)$ to $\mathcal{A}$'s committed challenge c. (As noted, the PUF's output is noisy and will vary slightly on any fixed input, so the equality is typically taken with respect to the output of a fuzzy extractor (e.g., Dodis et al., "Fuzzy Extractors: How to Generate Strong Keys from Biometrics and Other Noisy Data," *SIAM J. Comput.*, volume 38, no. 1:97-139, 2008)).

3. Robustness: $\Pr[\text{dist}(y,z) > t | x \leftarrow U_{\kappa_1}, y \leftarrow P(x), z \leftarrow P(x)] \le \epsilon_2$, i.e., the probability of a fixed PUF P yielding responses t-distant on the same input x is less than some sufficiently small $\epsilon_2$.

4. Indistinguishability: The output of the PUF device (typically fuzzy extractor output) preferably is computationally indistinguishable from a random string of the same length l, such that a PPT adversary $\mathcal{A}$'s advantage $\text{Adv}\,\mathcal{A}^{PUF\text{-}IND}(l)$ is at most negligibly more than ½. The indistinguishability of a PUF can be assessed, for example, through a game in which an adversary $\mathcal{A}$ is asked to differentiate between the output r of the fuzzy extractor for a PUF P and a randomly chosen string $s \in \{0,1\}^l$ of the same length l.

| PUF-IND: PUF Inistinguishability Game | | |
|---|---|---|
| Adversary A | | PUF Device P |
| (1) $c_i \in \text{CH} \subset C_P,$ $0 \le i \le \text{poly}(\lambda)$ | → | $(R_i, H_i) \leftarrow$ Gen($r_i = P(c)$) |
| | ← | $H_i \in \overline{R}_P \subset R_P,$ (2) $0 \le i \le \text{poly}(\lambda)$ |
| (3) $c_i \in \overline{\text{CH}} \subset C_P,$ $0 \le i \le \text{poly}(\lambda)$ | → | |
| | ← | $R_i \in \overline{R}_P \subset R_P,$ (4) $0 \le i \le \text{poly}(\lambda)$ |
| (5) Challenge $c \notin \overline{\text{CH}}$ | → | $b \in \{0, 1\}$ |
| | ← | $b(s \in \{0, 1\}^l)+$ (6) |

| PUF-IND: PUF Inistinguishability Game | | |
|---|---|---|
| Adversary A | | PUF Device P |
| (7) $c_i' \in \text{CH} \subset C_P,$ $c \ne c_i',$ $0 \le i \le \text{poly}(\lambda)$ | → | $(1 - b)(R_i),$ $R_i = \text{Rep}(P(c), H_i)$ |
| | ← | $R_i' \in \overline{R}_P \subset R_P,$ (8) $0 \le i \le \text{poly}(\lambda)$ |
| (9) Guess $b' \stackrel{?}{=} b$ | → | |

This game proceeds as follows:

1. Adversary $\mathcal{A}$ executes the enrollment phase on any challenge $c_i \in \bar{\mathcal{C}}_P$.

2. The PUF device returns the corresponding helper string $H_i$ from the output of Gen. Denote this set of challenge-helper pairs $(c_i, H_i)$ as $\mathcal{CH}$.

3. Adversary $\mathcal{A}$ now requests the PUF response $r_i = P(c_i)$ for any $c_i \in \bar{\mathcal{CH}}$. Denote the set of requested challenges in this step $\overline{\mathcal{CH}}$.

4. For all requests $c_i \in \bar{\mathcal{CH}}$, the PUF device returns the set $\{r_i | r_i \leftarrow P(c_i)\}$.

5. Adversary $\mathcal{A}$ selects a challenge $c \notin \bar{\mathcal{CH}}$, such that $\mathcal{A}$ has $H_i$ but not $R_i$ for c. The PUF device chooses a bit $b \in \{0,1\}$ uniformly at random.

6. If b=0, $\mathcal{A}$ is given $R_i = \text{Rep}(P(c) = r_i, H_i)$. Otherwise, if b=1 then $\mathcal{A}$ is given a random string $s \in \{0,1\}^l$.

7. Adversary $\mathcal{A}$ is allowed to query the PUF device for $c_i' \in \bar{\mathcal{CH}}$ so long as no $c_i' = c$.

8. For all requests $c_i' \ne c$, the PUF device returns the set $\{r_i' | r_i' \leftarrow P(c_i')\}$.

9. The adversary outputs a guess bit b', and succeeds when b'=b.

Related assessments of PUFs are provided by Hori et al., "Quantitative and Statistical Performance Evaluation of Arbiter Physical Unclonable Functions on FPGAs," 2010 *International Conference on Reconfigurable Computing and FPGAS (ReConFig)*, pages 298-303, 2010; Maiti, *A Systematic Approach to Design an Efficient Physical Unclonable Function*, dissertation, Virginia Tech, 2012, and others.

Various authentication schemes utilize zero knowledge proofs of knowledge, which is a method for proving that a given statement is true, while revealing nothing beyond this fact. The zero knowledge proof is an interaction between two parties: a prover $\mathcal{P}$ that wishes to establish the validity of a statement, and a verifier $\mathcal{V}$ that must be convinced the statement is true. The verifier should be convinced with overwhelming probability that a true statement is indeed true. With a zero knowledge proof of knowledge, the verifier could not use the messages from a previous proof to convince a new party of the statement's validity, and the messages reveal only a single bit of information: whether or not the prover $\mathcal{P}$ possesses the secret. There are two general classes of zero knowledge proofs: interactive zero knowledge proofs, where a series of messages are exchanged between the prover $\mathcal{P}$ and verifier $\mathcal{V}$, and non-interactive zero knowledge proofs, where the prover $\mathcal{P}$ conveys a single message $\mathcal{M}$ without interaction with $\mathcal{V}$, yet $\mathcal{V}$ is convinced that $\mathcal{P}$ possesses the secret. Many (interactive) zero knowledge proof systems require multiple iterations to establish the validity of a statement. That is, each interaction may succeed with some probability, even if the prover does not possess the secret (or the statement is false). Thus, if the probability of success when the statement is false is p, the protocol is run n times until $1-(p)^n$ is sufficiently close to 1.

SUMMARY OF THE INVENTION

An authentication system according to an embodiment of the invention facilitates the establishment of both endpoint identity, as well as a secure communication channel using a dynamically-generated key between two end devices (potentially on separate local area networks). An interactive or non-interactive authentication protocol is used to establish the identity of the target end device, and dynamic key generation is used to establish a shared symmetric session key for creating an encrypted communication channel between the end devices. In one embodiment, the shared symmetric session key may then be updated as desired, and encrypted under a new dynamically-generated key.

BRIEF DESCRIPTION OF THE DRAWING

FIG. 1 is a diagram illustrating dynamic key generation between devices in an embodiment of the present invention.

DETAILED DESCRIPTION OF EMBODIMENTS

The present detailed description is based on the example of an embodiment utilizing elliptic curve cryptography (including the associated terminology and conventions), but the inventive concept and teachings herein apply equally to various other cryptographic schemes such as ones employing different problems like discrete logarithm or factoring. Likewise, the invention is not limited by the various additional features described herein that may be employed with or by virtue of the invention.

In order to construct an intrinsic identity of a device, a public representation of the device's identity (referred to here as an enrollment token or public key) is generated. An elliptic curve mathematical framework may be used, but those skilled in the art will realize that other frameworks (e.g., discrete logarithm frameworks, in which regard U.S. Pat. No. 8,918,647 is incorporated here by reference) will provide the same functionality. A cryptographic enrollment token (or series of tokens) $\{(c_d, P_d, A_d \bmod p)\}$ is collected from each PUF device d in response to a challenge query (or queries) by the server. Each device chooses a private key $\mathcal{P}_d^{priv}$ uniformly at random from the space $\{0, 1\}^\lambda$, where $\lambda$ is the security parameter (e.g., the number of bits in the modulus p) and calculates $A_d = \mathcal{P}_d^{priv} \cdot G \bmod p$ as the device's public key, were G is a base point of order q on an elliptic curve over $\mathbb{F}$. Preferably, no sensitive information is transmitted over the communication channel or stored in non-volatile memory (for example, the device may discard $\mathcal{P}_d^{priv}$ after generating $A_d$). When $\mathcal{P}_d^{priv}$ is needed to authenticate the device, the enrollment token ($c_d, P_d, A_d \bmod p$) allows the device d to regenerate $\mathcal{P}_d^{priv}$ and complete the proof. Algorithm 1 describes an exemplary enrollment protocol in pseudocode.

---
Algorithm 1 Enrollment Algorithm
---
for Server s do
   Select finite field $\mathbb{F}_p$ of order p
   Select E, an elliptic curve over $\mathbb{F}_p$
   Find $G \in E/\mathbb{F}_p$, a base point of order q
end for ---
Algorithm 1 Enrollment Algorithm
---
for Server s do
   $c_d \leftarrow$ random $\in \mathbb{F}_p$, a random group element
   Device d $\leftarrow \{c_d, E, G, p, q\}$
end for
for PUF Device d do
   x = H($c_d$,E,G, p, q)
   O = PUF(x)
   helper$_d$ = P$_d$ = O $\oplus$ ECC(P$_d^{priv}$)
   token$_d$ = A$_d$ = P$_d^{priv}$ · G mod p
   Server s $\leftarrow$ {token$_d$, helper$_d$}
end for
for Server s do
   Store new enrollment entry $\{c_d, (P_d^{priv} \cdot G \bmod p), P_d\}$
end for (The enrollment process preferably should be required only once, and preferably should ensure that in the event of a security breach the device can remain active through a minor change on the server side without re-enrollment. As described in U.S. Pat. No. 8,918,647 which is incorporated herein by reference, a challenge-response tree can be constructed wherein only the root node is directly derived from a PUF response, with derived tokens being generated from those collected during enrollment.

A PUF-enabled device may locally store and retrieve a sensitive value preferably without storing any sensitive information in non-volatile memory. Algorithm 2 illustrates the storing of a sensitive value (e.g., $\mathcal{P}_d^{priv}$) using a PUF, and Algorithm 3 illustrates the regeneration of the sensitive value. The challenge $c_d$ and helper data helper$_d$ for device d can be public, as neither reveals anything about the sensitive value. While the present example uses encryption of the sensitive value by exclusive-or, $\oplus$, alternately the value could for example be used to form a key to other encryption algorithms (e.g., AES) to enable storage and retrieval of arbitrary-sized values.

---
Algorithm 2 PUF-Store
---
Goal: Store value P$_d^{priv}$
for PUF Device d do
   Select finite field $\mathbb{F}_p$ of order p
   Select E, an elliptic curve over $\mathbb{F}$
   Find $G \in E/\mathbb{F}_p$, a base point of order q
   Select challenge $c_d \in \mathbb{F}_p$
   x = H($c_d$, E, G, p, q)
   O = PUF(x)
   helper$_d$ = P$_d$ = O $\oplus$ ECC(P$_d^{priv}$)
   Write {$c_d$, helper$_d$} to non-volatile memory
end for ---
Algorithm 3 PUF-Retrieve
---
Goal: Retrieve value P$_d^{priv}$
for PUF Device d do
   Read {$c_d$, helper$_d$} from non-volatile memory
   x $\leftarrow$ H($c_d$, E, G, p, q)
   O' = PUF(x)
   P$_d^{priv} \leftarrow$ D(helper$_d \oplus$ O')
end for Whenever O and O' are t-close, the error correcting code ECC can be passed to a decoding algorithm D to recover the sensitive value.

The authentication phase allows a server to verify that a client device is authorized to issue a request. In an elliptic curve embodiment, upon receiving a request from a device, the server can conduct an elliptic curve variant of Chaum et al.'s ("An Improved Protocol for Demonstrating Possession of Discrete Logarithms and some Generalizations," *Proceedings of the 6th annual international conference on Theory and application of cryptographic techniques*; EUROCRYPT'87, pages 127-141, Springer, 1988) zero knowledge proof protocol with the device d to establish permission to perform the request, as shown in Algorithm 4.

---
Algorithm 4 Authentication Algorithm
--- for PUF Device d do
   Server s ← request
end for
for Server s do
   Device d ← $\{c_d, G, P_d, N, p, q\}$ where N is a nonce and P is the helper string
end for
for PUF Device d do
   x ← H($c_d$, E, G, p, q)
   $P_d^{priv}$ ← PUF-Retrieve
   r ← random $\in \mathbb{F}_p$, a random group element
   B ← r · G mod p
   h ← Hash(G, B, A, N)
   m ← r + h · $P_d^{priv}$ mod p
   Server s ← {B, m}
end for
for Server s do
   h' ← Hash(G, B, $A_d$, N)
   B' ← m · G − h' · A mod p Device d ← $\begin{cases} \text{accept: } B' = B \land \tau \text{ is current} \\ \text{deny: } B' \neq B \lor \tau \text{ is not current} \end{cases}$ end for

---

The requirement for communication front the verifying end device in the interactive zero knowledge proof is to obtain a nonce value specific to the current proof. This prevents an eavesdropping adversary from using previous proofs from a valid device to successfully complete an authentication protocol and masquerade as the end device.

A non-interactive zero knowledge proof removes this communication requirement, and allows a proof to be completed without interacting with the verifying endpoint. A non-interactive construction of Algorithm 4 requires the device to generate the nonce on behalf of the verifier in a manner that prevents the proving end device from manipulating the proof. As one example, the proving end device may construct the nonce N as N←H($\mathcal{P}_d^{priv}$·G mod p|$\tau$) where H is a hash function, $\tau$ is a timestamp and x|y denotes concatenation of x and y. The timestamp ensures that previous proofs constructed by the proving end device cannot be replayed by an adversary in the future, while the hash function ensures that the proving end device cannot manipulate the challenge in an adversarial manner. The timestamp preferably need not match the current timestamp on arrival at the prover, with the verifying endpoint instead checking that the timestamp is reasonably current (e.g. second granularity) and monotonically increasing to prevent replay attacks. Algorithm 5 provides a non-interactive authentication protocol.

---
Algorithm 5 Non-Interactive Authentication Algorithm
--- for PUF Device d do
   x ← H{$c_d$, E, G, p, q}

---
Algorithm 5 Non-Interactive Authentication Algorithm
---

$P_d^{priv}$ ← PUF-Retrieve
   $A_d$ = $P_d^{priv}$ · G mod p
   r ← random $\in \mathbb{F}_p$, a random group element
   B ← r · G mod p
   N ← Hash($A_d|\tau$) where $\tau$ is the current timestamp
   h ← Hash(G, B, $A_d$, N)
   m ← r + h · $P_d^{priv}$ mod p
   Server s ← {B, m, $\tau$}
end for
for Server s do
   $A_d$ = $P_d^{priv}$ · G mod p (stored from device enrollment)
   N ← Hash($A_d|\tau$)
   h' ← Hash(G, B, $A_d$, N)
   B' ← m · G − h' · $A_d$ mod p Device d ← $\begin{cases} \text{accept: } B' = B \land \tau \text{ is current} \\ \text{deny: } B' \neq B \lor \tau \text{ is not current} \end{cases}$ end for

---

Non-interactive authentication may be employed so as to provide first packet authentication in zero knowledge. For example, the first packet sent by the proving end device may contain the following authentication token, which is sufficient for the verifying end device to establish the identity of the proving end device: auth={B=r·G mod p, m=r+h·$\mathcal{P}_d^{priv}$ mod p,$\tau$}. The authentication is first packet in that no communication with the receiving (verifying) end device is necessary before constructing the authentication token. Further, verification of the sending (proving) end device completes without communication with the sending (proving) end device. An eavesdropping adversary observing packet auth will be unable to replay the packet, as the timestamp $\tau$ will no longer be current. Algorithm 6 illustrates device-to-device first packet mutual authentication.

---
Algorithm 6 Non-Interactive Mutual Authentication Algorithm
--- for PUF Device d $\in$ {0,1} do
   x ← H($c_d$, E, G, p, q)
   $P_d^{priv}$ ← PUF-Retrieve
   $A_d$ = $P_d^{priv}$ · G mod p
   r ← random $\in \mathbb{F}_p$, a random group element
   $B_d$ ← r · G mod p
   $N_d$ ← Hash($A_d|\tau_d$) where $\tau_d$ is the current timestamp
   h ← Hash(G, B, $A_d$, $N_d$)
   $m_d$ ← r + h · $P_d^{priv}$ mod p
   Device (1 − d) ← {$B_d$, $m_d$, $\tau_d$}
   $A_{(1-d)}$ ← QueryServer(DeviceID =(1 − d))
   $N_{(1-d)}$ ← Hash($A_{(1-d)}|\tau_{(1-d)}$)
   $h_{(1-d)}'$ ← Hash(G, $B_{(1-d)}$, $A_{(1-d)}$, $N_{(1-d)}$)
   $B_{(1-d)}'$ ← $m_{(1-d)}$ · G − $h_{(1-d)}'$ · ($A_{(1-d)}$) mod p Device (1 − d) ← $\begin{cases} \text{accept: } B'_{(1-d)} = B_{(1-d)} \land \tau_{(1-d)} \text{ is current} \\ \text{deny: } B'_{(1-d)} \neq B_{(1-d)} \lor \tau_{(1-d)} \text{ is not current} \end{cases}$ end for

---

Two communicating devices can as desired (i.e., dynamically), (re)authenticate using Algorithm 6 and simultaneously establish a new session key by sending an auth-update message including the authentication token and a new session key. Referring to FIG. 1 for example, if device D1 wishes to prove identity on the first packet to device D5, and simultaneously establish a new session key with device D5, the auth-update packet is then {$B_{D1}$=r·G mod p, $m_{D1}$=r+h· $\mathcal{P}_{D1}^{priv}$ mod p,$\tau_{D1}$, $E_{A_{D5}}$ (session-key$_{(D1,D5)}$), SIG$_{D1}$(H(session-key$_{(D1,D5)}$)))}.

One embodiment of such a device may comprise a Xilinx Artix 7 field programmable gate array (FPGA) platform, equipped, e.g., with 215,000 logic cells, 13 Megabytes of block random access memory, and 700 digital signal processing (DSP) slices. In an embodiment employing elliptic curve cryptography, for example, the hardware mathematics engine may be instantiated in the on-board DSP slices, with the PUF construction positioned within the logic cells, and a logical processing core including an input and output to the PUF and constructed to control those and the device's external input and output and to perform algorithms (sending elliptic curve and other mathematical calculations to the math engine) such as those described above. Devices (e.g., D1-D8 in FIG. 1) thus constructed can then be connected (such as via a network) and perform non-interactive mutual authentication and dynamic key generation. Numerous other physical embodiments are readily apparent, such as using a coating PUF over a larger integrated circuit, etc.

In another embodiment, a new 'public key' of the target end device can be generated without requiring communication with the target end device to encrypt a new random session key, which will supersede the current session key. The new public key may be generated, as desired, using derived tokens as described in U.S. Pat. No. 8,918,647, which is incorporated by reference in that regard.

One skilled in the art will realize that other combinations and adaptations of the exemplary features and algorithms may be used in different applications, and the use of the device's hardware identity may be applied to a variety of cryptographic authentication techniques not limited by the zero knowledge aspect of the example provided. For example, a device wishing to communicate with a system may initially perform authentication such as according to Algorithm 5 to authenticate in the first packet to the system and the system may then perform the dynamic session key establishment protocol (through an auth-update message) with the device to initiate a secure communication channel. Further, the authentication protocol need not be limited to zero knowledge, and could be based on other cryptographic constructions for establishing identity. For example, a server may send a device a challenge message, which the device digitally signs using its hardware identity e.g., using the private key regenerated by the device's PUF and a standard signature algorithm) and includes this signature in the packet header (e.g., TCP Options Header) returned to the server. Upon receipt, the server verifies the digital signature over its challenge is valid using the device's public key.

As one embodiment of the invention relies on an elliptic curve mathematical framework, one skilled in the art will realize that it may be extended to support cryptographically-enforced role based access control (RBAC). That is, data access policies and device credentials may be specified mathematically, and the RBAC algorithm computes a function $f(\mathcal{P}, \mathcal{C}) \mapsto \{0, 1\}$ mapping policies $\mathcal{P}$ and credentials $\mathcal{C}$ to an access decision in $\{0,1\}$. This is typically accomplished by constructing a bilinear pairing (e.g. Weil or Tate pairing).

What is claimed is:

1. A secure communication device comprising:
  a hardware identity module comprising a hardware-intrinsic identity unique to the device, wherein the hardware identity module is configured to output a unique value based on physical properties of circuitry of the hardware identity module and a challenge value associated with generation of an authentication token; and
  a processor connected to the hardware identity module, wherein the processor is configured to:
    receive an output value from the hardware identity module corresponding to the challenge value;
    generate, using the output value, a first authentication token encoded with a public key associated with the hardware-intrinsic identity of the secure communication device;
    generate a first authentication packet including the first authentication token; and
    transmit, to a verifying device, the first authentication packet for non-interactive authentication in zero knowledge, wherein the first authentication packet enables the verifying device to authenticate the secure communication device in zero knowledge by indicating, to the verifying device, that the secure communication device possesses a secret without revealing the secret to the verifying device.

2. The secure communication device of claim 1, wherein the processor is further configured to:
  encrypt a session key using asymmetric encryption and a public key associated with the verifying device; and
  include the encrypted session key in the first authentication packet.

3. The secure communication device of claim 1, wherein the processor is further configured to generate a nonce value for blinding the first authentication token.

4. The secure communication device of claim 2, wherein the processor is further configured to include in the first authentication packet an encrypted signature of the secure communication device over the session key.

5. The secure communication device of claim 1, wherein the processor is further configured to include, in the first authentication packet, a timestamp that indicates that the first authentication packet is current to an authentication session.

6. The secure communication device of claim 1, wherein the hardware identity module comprises a physical unclonable function.

7. The secure communication device of claim 6, wherein the processor is configured to send an authentication-update packet that includes an authentication token based on the hardware-intrinsic identity of the secure communication device and includes a session key.

8. The secure communication device of claim 1, wherein the processor is configured to perform elliptic curve cryptography to generate the first authentication token.

9. The secure communication device of claim 1, wherein the processor is further configured to send an authentication-update packet that includes an authentication token based on the hardware-intrinsic identity of the secure communication device and that includes an updated public key.

10. The secure communication device of claim 1, wherein the first authentication packet indicates, to the verifying device, that the secure communication device possesses the secret and limits information disclosed to the verifying device to confirmation that the secure communication device is in possession of the secret.

11. A computer-implemented method of non-interactively authenticating a secure communication device, the method comprising:
  receiving, by a processor, an output from a hardware identity module comprising a hardware-intrinsic identity unique to the secure communication device responsive to a challenge value associated with generation of an authentication token, wherein the output is based on physical properties of circuitry of the hardware identity module;

generating, by the processor, using the output, a first authentication token encoded with a public key associated with the hardware-intrinsic identity of the secure communication device;

generating, by the processor, a first authentication packet including the first authentication token; and transmitting, by the processor, the first authentication packet for non-interactive authentication in zero knowledge at a verification device, wherein the first authentication packet enables the verifying device to authenticate the secure communication device in zero knowledge by indicating, to the verification device, that the secure communication device possesses a secret without revealing the secret to the verification device.

12. The method of claim 11 further comprising an act of encrypting a session key using asymmetric encryption and the public key of the verifying device; and including the encrypted session key in the first authentication packet.

13. The method of claim 12, further comprising encrypting, in the first authentication packet, a signature of the secure communication device over the session key.

14. The method of claim 11, further comprising generating a nonce value for blinding the authentication token.

15. The method of claim 11, further comprising including, in the first authentication packet, a timestamp that indicates that the first authentication packet is current to an authentication session.

16. The method of claim 11, wherein:
the hardware identity module comprises a physical unclonable function (PUF), and
the act of generating the first authentication token includes using a PUF output to encode a zero-knowledge proof token.

17. The method of claim 11, further comprising:
generating, by the processor, an authentication-update packet to include an authentication token based on the hardware-intrinsic identity of the secure communication device and to include a session key; and
sending, by the processor, the authentication-update packet to the verifying device.

18. The method of claim 11, further comprising:
generating, by the processor, an authentication-update packet to include an authentication token based on the hardware-intrinsic identity of the secure communication device and to include an updated public key; and
sending, by the processor, the authentication-update packet to the verifying device.

19. The method of claim 11, wherein the first authentication packet indicates, to the verification device, that the secure communication device possesses the secret and limits information disclosed to the verification device to confirmation that the secure communication device is in possession of the secret.

20. At least one non-transitory computer-readable storage medium containing processor-executable instructions that, when executed, perform a method comprising:
receiving an output from a hardware identity module of a secure communication device comprising a hardware-intrinsic identity unique to the secure communication device responsive to a challenge value associated with generation of an authentication token, wherein the output is based on physical properties of circuitry of the hardware identity module;
generating, using the output, a first authentication token encoded with a public key associated with the hardware-intrinsic identity of the secure communication device;
generating a first authentication packet including the first authentication token; and
transmitting the first authentication packet for non-interactive authentication in zero knowledge at a verification device, wherein the first authentication packet enables the verifying device to authenticate the secure communication device in zero knowledge by indicating, to the verification device, that the secure communication device possesses a secret without revealing the secret to the verifying device.

* * * * *